(No Model.)
E. P. HAFF.
CORKSCREW.
No. 317,123. Patented May 5, 1885.
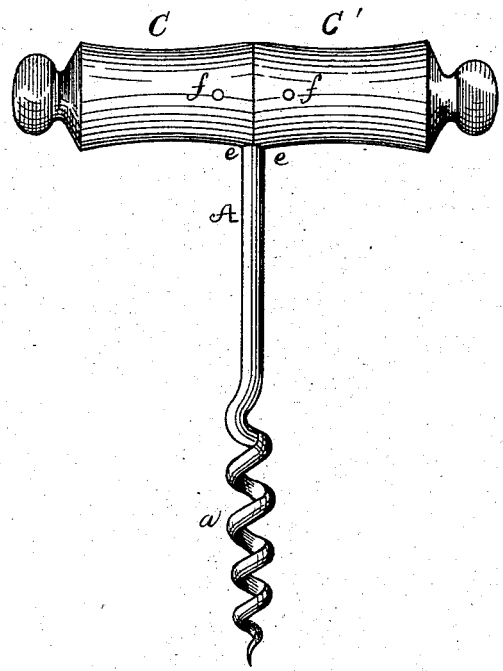
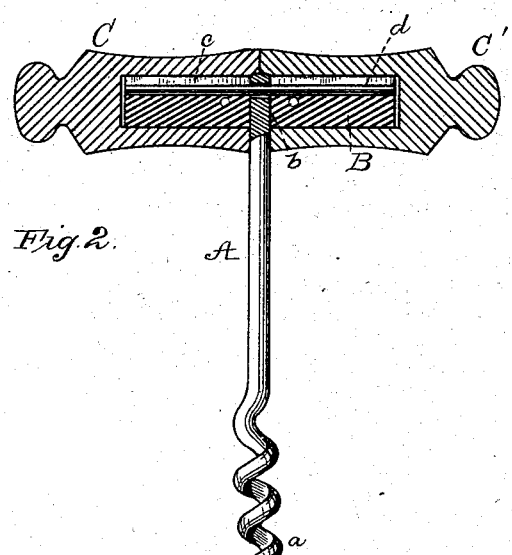
ATTEST:
E. C. Rowland
J. G. Greene Jr.
INVENTOR:
Edward P. Haff
By Dyer & Seely
Attys

UNITED STATES PATENT OFFICE.

EDWARD P. HAFF, OF BROOKLYN, NEW YORK.

CORKSCREW.

SPECIFICATION forming part of Letters Patent No. 317,123, dated May 5, 1885.

Application filed December 31, 1884. (No model.)

*To all whom it may concern:*

Be it known that I, EDWARD P. HAFF, of Brooklyn, in the county of Kings and State of New York, have invented a certain new and useful Improvement in Corkscrews, of which the following is a specification.

My invention relates to handles for corkscrews and like implements of that character set forth in my application Serial No. 147,913—that is to say, those in which the handle consists of a core to which the metal shank is attached and an inclosing-casing for said core.

The object of the present invention is to give increased strength to the handle and to the junction between the handle and the shank.

My invention is illustrated in the annexed drawings, in which Figure 1 is a view in elevation of a complete corkscrew embodying said invention; Fig. 2, a longitudinal section, and Fig. 3 a cross-section of the handle.

A is the metal shank, formed into a screw, $a$, at its lower portion.

B is the core or body of the transverse handle, which is preferably of wood, but may be of metal or of any suitable material having sufficient strength for the purpose. It has an aperture through it at $b$ and a longitudinal groove, $c$, on its upper side. This groove is preferably larger at its lower than at its upper part, as shown.

The shank A has a hole through it near its upper end, and it is inserted in aperture $b$ in the core or body B until this hole comes opposite the groove $c$. A pin, $d$, which is a wire of suitable size, is then passed through the groove $c$ and the hole in the shank, and so secures the shank to the core or body of the handle.

To complete the handle the external shell or casing, C C′, is placed upon it. This is composed of two parts, each closed at one end, which are placed upon the core from opposite ends and meet at the center, thus completely covering the core. The parts C C′ have each a notch at $e$ to fit around the shank. These parts may have any suitable plain or ornamental form. Pins $ff$ may be used to attach the casing to the core. The casing may, however, be simply forced tightly upon the core, or it may be secured with glue or in any other suitable manner.

The external shell or casing may be of wood, metal, or any material of which it is desired to have the surface of the handle composed, as set forth in the prior application above mentioned.

The longitudinal pin $d$ preferably extends the whole length of the core or body B, though in some cases it may be made shorter if of sufficient length to securely attach the parts together.

While I prefer to pass the shank through the core before connecting them by means of the longitudinal pin, in some cases the groove may be in the lower side of the core, the end of the shank inserted in said groove, and the pin passed through the groove and shank together. The form shown, however, provides a more secure attachment.

I have set forth my invention with reference to a corkscrew; but evidently it is also applicable to other tools or implements having similar transverse handles.

What I claim is—

1. In a corkscrew or similar implement, the combination, with the shank, of the handle comprising a core, a pin securing the shank to said core, and an external casing, substantially as set forth.

2. In a corkscrew or similar implement, the combination, with the shank, of the handle comprising a core, a pin securing the shank to said core, and a two-part casing inclosing said core, substantially as set forth.

3. In a corkscrew or similar implement, the combination, with the shank, of the handle comprising a core, a pin passing longitudinally through the core and through the head of the shank, and an external casing for said core, substantially as set forth.

4. In a corkscrew or similar implement, the combination, with the shank, of the handle comprising a grooved core, a pin passing through the groove and through the head of the shank, and an external casing, substantially as set forth.

This specification signed and witnessed this 23d day of December, 1884.

EDWARD P. HAFF.

Witnesses:
H. W. SEELY,
T. G. GREENE, Jr.